July 21, 1970 — A. J. STERN ET AL — 3,521,354
DOWEL ASSEMBLY AND METHOD
Filed Aug. 14, 1968 — 2 Sheets-Sheet 1
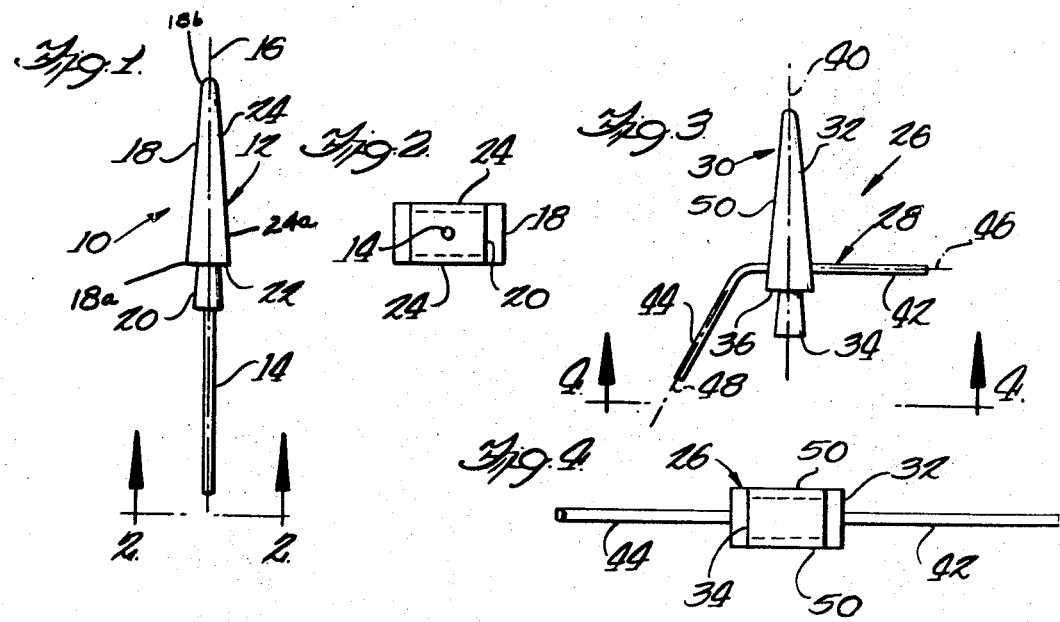
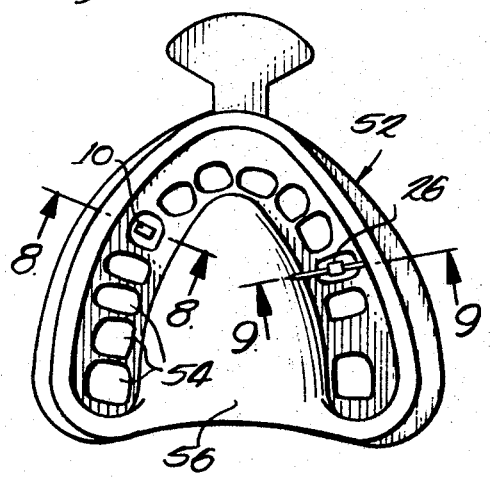
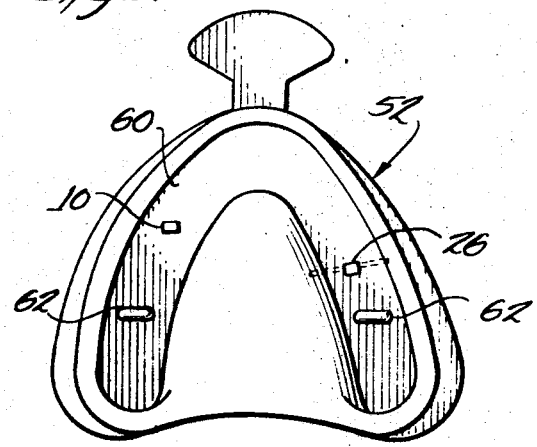
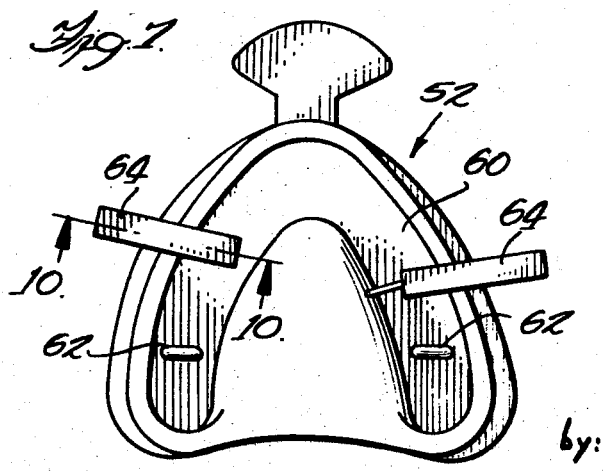
Inventors
ALFRED J. STERN
HAROLD L. STERN
by: Dawson, Tilton, Fallon & Lungmus
Att'ys

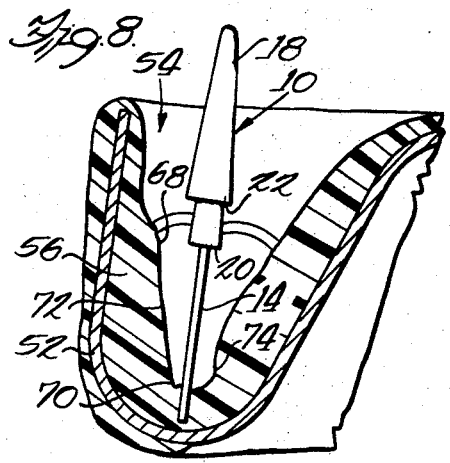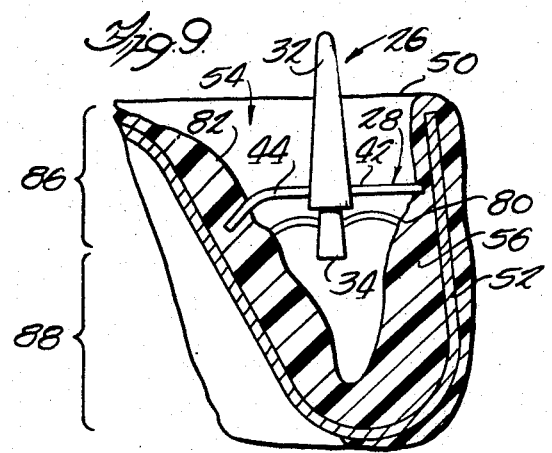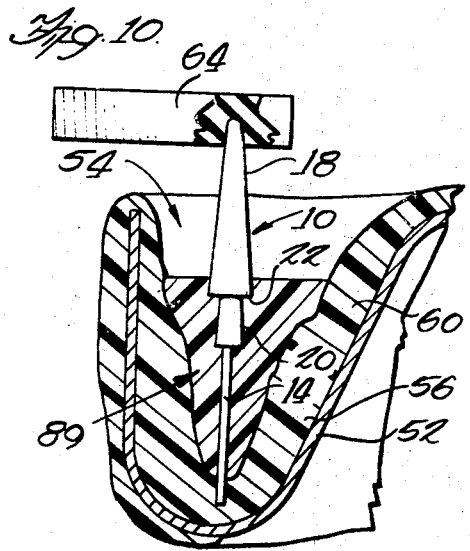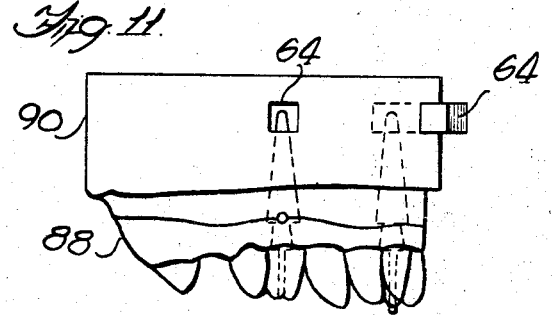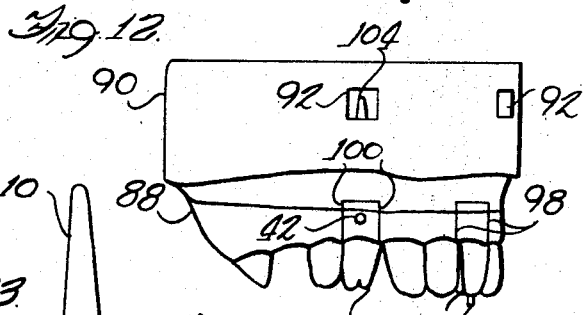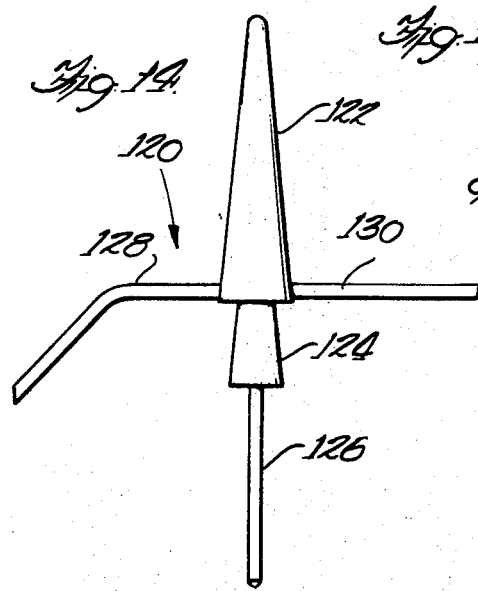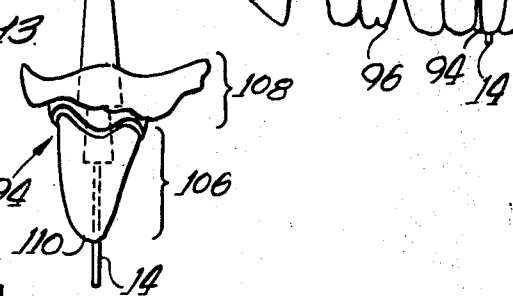

United States Patent Office 3,521,354
Patented July 21, 1970

3,521,354
DOWEL ASSEMBLY AND METHOD
Alfred J. Stern, 5307 Volkeith St., and Harold L. Stern, 6906 Van Etten St., both of Houston, Tex. 77021
Continuation-in-part of applications Ser. No. 579,748, Sept. 15, 1966, Ser. No. 595,557, Oct. 27, 1966, and Ser. No. 656,921, July 28, 1967. This application Aug. 14, 1968, Ser. No. 752,703
Int. Cl. A61c 13/60
U.S. Cl. 32—11                   7 Claims

ABSTRACT OF THE DISCLOSURE

A method for making a positive replica of a tooth from a negative impression of the tooth formed in impression material. An elongated dowel having a pre-positioning pin secured thereto is positioned in the negative impression by impaling the pre-positioning pin into the impression material. The negative impression is filled with a die material to a level above the lower end of the dowel and allowed to harden and thereafter a base stone material is cast over the die material.

RELATED APPLICATIONS

This application is a continuation-in-part of our prior co-pending applications entitled "Dowel Assembly," Ser. No. 579,748, filed Sept. 15, 1966 now U.S. Pat. No. 3,454,-256 issued July 8, 1969; "Dowel Positioning Means," Ser. No. 595,557, filed Oct. 27, 1966 now U.S. Pat. No. 3,330,557; and "Dowel Assembly With Removable Positioning Means," Ser. No. 656,921, filed July 28, 1967 now U.S. Pat. No. 3,413,725 issued Dec. 3, 1968.

BACKGROUND

This invention relates to a method and apparatus for preparing models of teeth for use in making bridges and abutments for partials or any other purpose for which a removable or reinforced abutment is desirable.

It is a common practice, when making a model of a patient's teeth, to first form a negative impression of the teeth. Dowel or mounting pins are positioned in the center of impressions of particular teeth which are to be worked on. The negative impressions of the teeth are then filled with a die material to form a positive replica or die of the teeth. After the die material has cured or set, the model is completed by casting a base stone formed integrally with the die material to form a foundation for the replica of the teeth. A tooth which is to be worked on is separated from the model by cutting the die material with a saw or other means and lifting the tooth die, on its dowel or mounting pin, from the base stone. The dowel or mounting pin facilitates handling the tooth die and the repositioning of the tooth die back on the base stone.

The satisfactory results obtained by the above method for fabricating models of teeth is shown by the widespread usage of the method by dentists and dental technicians. A major difficulty encountered in practicing the method lies in positioning the dowel or mounting pin in the center of the negative impression of the teeth which are to be worked on. If a longitudinal axis of the dowel is located at a substantial angle relative to a vertical axis of the tooth impression, the model may be ruined when the tooth die is separated from the base stone. If the dowel extends into an adjacent tooth, the removal of a selected tooth die is extremely difficult, if not impossible. Also, if the dowel is positioned in an abutting relationship with side walls of the tooth impression, the die of the tooth is ruined by the projecting surface of the dowel.

Therefore, it is essential that the dowel be maintained in a substantially vertical position in the center of the impression of the tooth, and if desired parallel to each other.

The most common prior art method of positioning a dowel in a tooth impression consists of manually inserting and holding the dowel in the impression of a tooth. In practicing this method of positioning a dowel, the negative impression of the tooth is first filled with a die material. The dowel is then inserted into the die material in the negative impression of a tooth, and the die material then sets or crystallizes. This method of positioning a dowel requires that the dowel be positioned by a skilled dental technician relative to the negative impression of a tooth after the impression has been filled with die material. Since the die material blocks the dental technician's vision of side surfaces of the negative impression of a tooth, it is almost impossible to accurately position a dowel relative to the negative impression of a tooth with the prior art method.

Another prior art solution to the problem of positioning a dowel in a tooth impression consists of using a jig to hold the dowel. The jig is usually attached to a dental impression trough or a separate stand and includes a plate member which overlies the negative tooth impression. A rod, to which the dowel is attached, is then suspended from the plate to center the dowel in the tooth impression. The vertical and lateral adjustment of a jig to position a dowel in a tooth impression is both difficult and time-consuming. The difficulties are greatly increased when several dowels are to be positioned by the same jig in several adjacent tooth impressions. Also, a large number of the relatively expensive jigs must be purchased and maintained by a dental laboratory which makes many models of teeth in the course of a day.

SUMMARY

Our invention provides an inexpensive method and apparatus for quickly and easily positioning a dowel in a negative impression of tooth. The dowel is supported directly by the impression material and is securely retained while the impression is filled with die material.

DESCRIPTION OF THE DRAWING

FIG. 1 is an enlarged side view of a dowel assembly illustrating a first embodiment of the invention;

FIG. 2 is an enlarged end view, taken along the line 2—2 of FIG. 1, further illustrating the dowel assembly;

FIG. 3 is an enlarged elevational view of a second embodiment of a dowel assembly illustrating the invention;

FIG. 4 is an enlarged end view, taken along the line 4—4 of FIG. 3, further illustrating the dowel assembly of FIG. 3;

FIG. 5 is a plan view of a dental impression tray in which a negative impression of teeth is formed and in which the dowel assemblies of FIGS. 1 and 2 are mounted;

FIG. 6 is a plan view of the dental impression tray of FIG. 5 with die material filling the negative impressions of teeth;

FIG. 7 is a plan view of the mounting tray of FIG. 6 illustrating the positioning of channel forming members on the dowel assembly of FIGS. 1 and 2.

FIG. 8 is an enlarged sectional view, taken along the line 8—8 of FIG. 5 illustrating the mounting of the dowel assembly, shown in FIG. 1, in the negative impression of a tooth;

FIG. 9 is an enlarged sectional view, taken along the line 9—9 of FIG. 5, illustrating the mounting of the dowel assembly, shown in FIG. 3, in the negative impression of a tooth;

FIG. 10 is an enlarged sectional view, taken along the line 10—10 of FIG. 7 illustrating the relationship between a channel forming member, a positive replica of a tooth and the dowel assembly of FIG. 1;

FIG. 11 is a side view of a model of teeth, illustrating the positioning of dowel assemblies, similar to those of FIGS. 1 and 3, and the use of channel forming members, similar to those illustrated in FIGS. 7 and 10;

FIG. 12 is a side view of the model of FIG. 11 with the channel forming members removed and a selected tooth separated from the other teeth to enable the tooth to be removed from the model;

FIG. 13 is a perspective view of a tooth mounted on a dowel assembly; and

FIG. 14 is a side view of a third embodiment of a dowel assembly illustrating the invention.

DESCRIPTION OF SPECIFIC EMBODIMENT

Referring now to the drawing in greater detail, a dowel assembly 10 is illustrated in FIG. 1. The dowel assembly 10 is intended for use by dentists and laboratory technicians for retaining a positive replica of a patient's teeth on a base stone. The dowel assembly 10 includes a dowel 12 from which a pin or leg section 14 projects. The pin 14 is mounted coaxially with the longitudinal axis 16 of the dowel 12. The dowel 12 includes a body portion 18 from which a shank 20 extends. The body portion 18 and shank 20 are separated by a radially outwardly extending shoulder or collar 22. It is to be understood, however, that other configurations of the dowel may be used. For example, the body portion 18 of the dowel can be either completely conical or can be substantially conical except for a longitudinally extending flat surface.

As is perhaps best seen in FIG. 2, the body portion 18 is formed with a pair of opposite flat parallel key surfaces 24 which extend for substantially the entire longitudinal length of the body portion and a pair of flat inclined surfaces 24a which provide the body portion with a wide end 18a and a narrow end 18b. As will be explained in greater detail subsequently, the key surfaces 24 are utilized to orient the dowel assembly 10 in a socket in a base stone. The flat key surfaces 24 mate with similar surfaces in the socket of the base stone so that, when the dowel assembly 10 is removed from the socket, it is always repositioned in the same orientation as when the model was made.

Referring now to FIG. 3, a second embodiment of the dowel assembly is shown. In this embodiment a dowel assembly 26 includes a transverse or radially outwardly extending pin or leg section 28 which is connected to a dowel body 30. As in the embodiment of FIGS. 1 and 2, the dowel includes a body portion 32 from which a shank section 34 extends. The shank section 34 is separated from the body portion 32 by a shoulder or collar 36. The body portion and shank are positioned coaxially with a longitudinal axis 40 of the dowel assembly 26.

The pin 28 includes a first relatively straight radially outwardly extending section 42 which may advantageously be connected by spot welding or brazing to the body portion 32. A second radially outwardly and downwardly extending pin section 44 is also attached to the body portion. The pin section 42 is located with a longitudinal axis 46 oriented at right angles to the longitudinal axis 40 of the dowel assembly. The pin section 44 is mounted with a longitudinally extending axis 48 at an acute angle to the longitudinally extending axis 40 of the dowel assembly. As seen in FIG. 4, the pin sections 42 and 44 extend radially outwardly from the body portion 32. As will be explained in greater detail subsequently, the downwardly sloping pin section 44 enables the dowel assembly 26 to be readily mounted relative to a negative tooth impression. The pin assembly 26 is also provided with a pair of flat positioning key surfaces 50 to facilitate the locating of the dowel assembly 26 relative to a base stone.

As explained more fully in our prior co-pending application entitled "Dowel Assembly With Removable Positioning Means," Ser. No. 656,921, filed July 28, 1967, the dowel assembly 10 of FIG. 1 may be provided with a longitudinally extending groove in the shank 20 which receives the pin 14. Similarly, the base section 32 of the dowel assembly 26 illustrated in FIG. 3 may be provided with a transversely extending groove in one of the surfaces 24 to receive the pin 28, which may be integral. Other means for retaining the pins may also be used. For example, the dowel may be provided with holes through which the pins are inserted. The dowel could also be made in two parts which would snap together over a pre-positioning pin, thereby securing the pin to the dowel.

Referring now to FIG. 5, a dental tray 52 is shown in which negative impression 54 of teeth and the associated gum areas are formed. The negative impressions 54 are formed in a suitable elastomeric impression material 56. The impression material 56 can be any of the commercially available elastomeric materials which are commonly formed of a silicone base rubber, mercaptan base rubber, or hydrocolloid.

The dowel assemblies 10 and 26 are mounted adjacent to negative impressions of teeth which have been selected for dental work. After the pin assemblies 10 and 26 have been positioned in the tray 52, the negative impressions 54 are filled with a suitable die material 60, as shown in FIG. 6. The die material 60 can be Bingle Die, which is an epoxy based die resin, any of the commercially available calcium sulfate hemihydrate compounds, or other suitable and well known materials. A pair of wire loops or screw eyes 62 are positioned in the die material 60 to facilitate the attaching of a positive replica of the teeth on a base stone. In FIGS. 7 and 10, channel forming members 64 are placed on an outwardly projecting end portion of the dowel assemblies 10 and 26 to form channels in the base stone to facilitate the removal of a selected tooth from the base stone.

The above well known process of forming a positive replica of a patient's teeth is facilitated by the use of the dowel assembles 10 and 26. The dowel assembly 10 facilitates the practice of the process by the use of the downwardly extending pin or leg section 14 which is mounted in direct engagement with the impression material 56 in the dental tray 52 (see FIG. 8). The pin 14 pierces an inner surface or wall 68 of a negative impression 54 of a tooth to locate the dowel assembly 10 in a central portion of the negative impression 54. In the example of FIG. 8, the pin or leg 14 engage the incisal area 70 of the crown portion of a tooth. When practicing the present invention it is contemplated that the pin or leg 14 will engage a non-critical area of the impression, that is an area away from margins, slots, or pinhole preparations. It should be noted that the dowel assembly 10 is retained in a spaced apart relationship relative to the critical side walls 72 and 74 of the crown portions of a negative impression of a tooth by the impaling of the pin 14 in the impression material 56.

Referring now to FIG. 9, the dowel assembly 26 is shown mounted in a dental tray 52 with the pin section 42 engaging a labial or front surface 80 of the negative impression 54. The angular pin section 44 engages a lingual or rear surface 82 of the negative impression 54. It should be noted that the pin section 42 engages the front surface 80 of the negative impression 54 at an associated non-vital gum area 86 away from a tooth or crown area 88. In a similar manner, the pin section 44 engages the rear surface 82 of the negative impression 54 at the associated non-vital gum area 86. Of course, the position of the dowel assembly 26 can be reversed so that the pin section 42 engages the rear surface 82 and the pin 44 engages the front surface 80.

The dowel assembly 26 is mounted in the impression 54 by inserting the straight pin portion 42 into the labial or buccal surface of the impression material and then rocking the angular pin portion 44 into the lingual surface of the impression material. The pin 28 may be bent or cut to accommodate insertion into a relatively small impression. If necessary, the placement sequence may be reversed by impaling the straight portion of the pin into the lingual surface and then the angled portion into the labial or buccal surface. The two pin portions 42 and 44 engage the impression material 56 to retain the dowel assembly in a generally vertical relationship spaced apart from the labial and lingual surfaces 80 and 82 of the negative impression 54.

As previously indicated, with the dowel assembly 26 the pin sections 42 and 44 extend through the non-vital gum area 86 associated with the negative impression 54. With the dowel assembly 10, the pin 14 extends through the comparatively vital tooth or crown area 88 of the negative impression 54. Therefore, the pin 14 must be carefully trimmed or cut back. However, with the dowel assembly 26, the pin sections 42 and 44 project through a non-vital upper area of the gum impression. Since the die material 60 is usually trimmed back in this area, the outwardly protruding end portions of the pin sections 42 and 44 can be trimmed at the same time the die material is trimmed. It will also be appreciated that the two radially extending pin sections 42 and 44 will securely support the dowel assembly 26 in a predetermined position relative to the negative impression 54.

As is perhaps best seen in FIG. 10, the negative impressions 54 are filled with die material 60, which can be any of the commercially available die materials, such as a "Bingle Die," to a level above the radially outwardly extending shoulder 22 of the dowel assembly 10. The lower end portion of the base section 18 and the shank section 20 are engaged by the die material 60 to prevent the dowel assembly 10 from being displaced vertically from a positive replica 89 of a tooth in the associated gum. The channel forming members 64 are then connected to an upper end portion of the body section 18. A base stone 90 (see FIGS. 11 and 12) is then cast over the positive replica 89 of a tooth. The base stone 90 is formed of plaster of paris, or any other suitable material, and provides a mounting means for the positive replica of a patient's tooth.

As is shown in FIG. 11, the channel forming members 64 project outwardly of the base stone 90. When the channel forming members 64 are pulled outwardly from the base stone 90, a rectangular channel 92, as shown in FIG. 12, is formed. Teeth 94 and 96, which are to be worked on, are separated from the positive replicas of the other teeth in a patient's mouth by saw cuts 98 and 100. The positive replicas 94 and 96 can then be disengaged from the base stone 90 by prying against an end portion of the base 18 or 32 of the dowel assemblies 10 and 26, as indicated at 104 in FIG. 12. The separated positive replica of a tooth 94 is mounted on the associated dowel assembly 10 for ease of handling, as shown in FIG. 13. It should be noted that both a crown portion 106 and an associated gum portion 108 of the tooth replica 94 are separated from the base stone 90.

From an inspection of FIG. 13 it is apparent that the dowel assembly 10 project centrally through the positive replica 94. Therefore, the positive replica 94 is structurally strengthened by the dowel assembly 10. The dowel assembly 26 does not project through a positive replica of a tooth and does not increase the structural strength of a positive replica of a tooth to the same extent as does the dowel assembly 10. However, it is believed that many laboratory technicians and dentists will prefer the dowel assembly 26, since the pin sections 42 and 44 project through a non-critical surface area of the positive replica.

The dowel assemblies 10 and 26 can advantageously be combined to form a single pin dowel assembly 120 (see FIG. 14). The dowel assembly 120 includes a body 122 from which a shank 124 extends. A longitudinally outwardly or downwardly extending pin or leg section 126 is connected to the shank 124 in much the same manner as previously described for the dowel assembly 10 in FIG. 1. In addition, transversely outwardly extending pin sections 128 and 130 are connected to the body 122 of the dowel. The transversely extending pin section 128 has an angular configuration similar to the pin section 44 of the dowel assembly 26. The dowel assembly 120 incorporates many of the advantages of both the dowel assembly 10 and the dowel assembly 26. In addition, by providing both transversely extending pin sections and longitudinally extending pin sections, the dowel assembly 120 can be firmly mounted relative to the negative impression of a tooth in unusual situations which might require such a firm mounting. Also, any of the outwardly extending pin sections 126, 128 and 130 can be clipped off to provide either the dowel assembly 10, the dowel assembly 26, or a variation of these two dowel assemblies.

As explained hereinbefore, the shank 124 may be provided with longitudinal groove which receives the pin 126, and the body portion 122 may be provided with a transverse groove adjacent its wide end to receive an integral positioning pin which provides the straight portion 130 and angle portion 128.

METHOD OF OPERATION

The manner in which the present invention may be practiced and the purpose to which it may be put are evident from the foregoing description. However, for purposes of affording a more complete understanding of the invention, it is advantageous now to provide a functional description of the mode in which the invention is practiced. When crowns or inlays are to be cast in teeth, a negative impression of the patient's teeth is first formed in a suitable impression material 56 in the dental tray 52. The dowel assemblies 10 and 26 are then mounted in direct engagement with the impression material 56 by impaling the dowel assemblies on outwardly extending pins or legs 14 and 28 in the impression material. The pins or legs 14 and 28 retain the body sections 12 and 30 of the dowel assemblies 10 and 26 in a spaced-apart relationship relative to the critical downwardly extending side walls of the negative impressions 54. After the dowel assemblies 10 and 26 have been mounted on the impression material 56, a suitable die material 60 is flowed into the negative impressions to form positive replicas of a patient's teeth and the associated gum area. A base stone 90 is then integrally cast with the positive replica of the patient's teeth and gum area. The teeth which are selected for forming the crowns and the inlays are separated by saw cuts 98 and 100 from the adjacent positive replicas of a patient's teeth. The selected teeth can then be removed on the associated dowel assembly from the base stone 90. The flat parallel positioning key surfaces 24 and 50 facilitate the repositioning key surfaces 24 and 50 prevent the positive replica of the tooth from rotating and reposition the positive replica of the tooth accurately relative to the base stone 90.

Applicants' dowels also provide quick and stable positioning of the dowels. The dowel illustrated in FIGS. 3 and 9 is positioned by a two-step procedure. The straight pin portion 42 is first inserted into the labial surface 80 of the impression material, and the dowel is then rocked toward the lingual surface to insert the angled pin portion 44. When both pin portions are inserted, the dowel is positioned against any undesirable movement. Since the dowel is secured to both the labial and lingual surfaces, rocking or tilting of the dowel either labially (i.e., in the direction toward the lips) or lingually (i.e., in the direction toward the tongue) is restrained. Further, the angled portion 44 prevents rotation of the dowel about the straight portion of the pin. Thus, the dowel is restrained against rocking or tilting either mesially (i.e., toward the middle of the mouth) or distally (i.e., toward the back of the mouth). Secure positioning of the dowel is extremely important since the impression is usually vibrated when the die material is added to spread the die material throughout the impression.

The two-step procedure of positioning the dowel made possible by the angled pre-positioning pin allows the labial-lingual position and the mesial-distal position to be accurately determined. After the straight pin portion 42 is inserted into the labial surface, the pin may be inserted as far as necessary to obtain the proper labial-lingual position. Thereafter, the angled portion 44 may be inserted into the lingual surface of the impression material at the desired point along this surface in the mesial-distal direction.

It will be appreciated that dowels must be accurately positioned within a relatively small tooth impression, and a dowel is frequently improperly positioned on the first try. If the dowel is improperly inserted, the positioning pins must be removed from the impression material and reinserted, and applicants' positioning pin means facilitates this insertion and reinsertion techniques.

The parallel flat sides 24 of the dowel illustrated in the drawing cooperates with the positioning pin to facilitate proper positioning. The flat sides extend in the same direction as the pins and allow the technician to "feel" the proper position as the pins are being inserted into the impression material.

The dowel illustrated in FIGS. 1 and 8 are securely positioned by inserting the straight pin 14 well into the crown portion of the impression material. This is the first time that a dowel has been provided which is so positioned, and accurate positioning is usually obtained on the first try because the dowel is merely pushed downwardly in the center of the impression cavity until the positioning pin is firmly impaled in the impression material. We have found that the pin 14 not only provides pre-positioning means, but it strengthens to model tooth that is formed. The pin may be inserted well into the impression material so that the dowel is very firmly held against movement.

When the dowel assembly 10 is used, the longitudinally extending pin 14 will extend outwardly from the crown portion of the positive replica of a tooth. Thus, the positive replica of the tooth is reinforced by the pin 14. The dowel assembly 26 is formed with outwardly extending pin sections 42 and 44 which will extend out of a non-critical upper portion of the positive replica of a tooth. The outwardly projecting pin section of the dowel assemblies can be readily trimmed away without danger of marring the critical incisal or occlusal surface of the replica of a tooth. The trimming can be accomplished by a true separating disc, and any remaining projection can be polished with an abrasive rubber wheel.

Although the dowels illustrated includes a body portion having a generally rectangular transverse cross section, other configurations may be used. For example, the horizontal cross section of the body portion may have some other shape or may be substantially oval or conical with one flat side. Further, the pins may be inserted in holes in the dowels rather than grooves. It is also contemplated that the dowels can be made by various methods, such as die casting, die punching, extruding, and the like. The dowels can also be molded of plastic with integrally formed plastic pins or metal pins can be attached to plastic dowels.

While in the foregoing specification, particular embodiments of our invention have been described in considerable detail for the purpose of illustration, it is to be understood that many of the details herein given may be varied considerably by those skilled in the art without departing from the spirit and scope of our invention.

We claim:

1. A dental apparatus for use in making a positive replica of a tooth from a negative impression of the tooth formed in impression material, said negative impression material having front and back tooth-defining walls and a crown portion, comprising an elongated metal dowel having an elongated body portion and a shank portion, said body portion having a pair of flat generally parallel surfaces and being tapered along its longitudinal length to provide a wide end and a narrow end, said shank portion extending longitudinally from the wide end of said body portion, and a relatively straight metal pin spot-welded to said dowel and extending generally longitudinally from the shank portion, whereby said pin may be inserted into the crown portion of the impression to restrain the dowel against movement and to firmly and accurately position the dowel in the impression material.

2. The method of claim 1 including the steps of removing the die material from the impression material after the die material has hardened, and trimming the portion of the pin projecting outwardly from the die material.

3. A method of forming a positive replica of a tooth comprising the steps of forming a negative impression of the tooth in impression material, said negative impression being defined by front and back tooth-defining walls and a crown portion formed in the impression material, positioning a dowel assembly within the negative impression, said dowel assembly including an elongated dowel and a pin, said dowel having an elongated body portion and a shank portion, said pin extending generally longitudinally from the shank portion and secured thereto, inserting said pin into the crown portion of the impression material to secure said dowel assembly and to position said dowel relative to said negative impression, pouring a hardenable die material into said negative impression to a level above the lower end of said shank portion, said shank portion adapted to cooperate with said die material when the die material hardens to restrain withdrawal of the dowel from the die material.

4. The method of claim 3 including the steps of removing the die material from the impression material after the die material has hardened and trimming the portion of the pin projecting outwardly from the die material.

5. A method of forming a positive replica of a tooth comprising the steps of forming a negative impresison of the tooth in impression material, said negative impression being defined by front and back tooth-defining walls and a crown portion formed in said impression material, positioning a dowel assembly within the negative impression, said dowel assembly including an elongated dowel and a pin secured to the dowel, inserting said pin into the crown portion of the impression material to secure said dowel assembly and to position said dowel relative to said negative impression, pouring a die material into said negative impression to a level above the lower end of said dowel, said dowel including a shank portion adjacent the lower end thereof adapted to cooperate with said die material to restrain withdrawal of the dowel from the die material, and casting a base stone on top of the die material.

6. A dental apparatus for use in making a positive replica of a tooth from a negative impression of the tooth formed in impression material, said negative impression material having front and back tooth-defining walls and a crown portion, comprising an elongated dowel having an elongated body portion and a shank portion, said body portion having at least one flat surface and being tapered along its longitudinal length to provide a wide end and a narrow end, said shank portion extending longitudinally from the wide end of said body portion, and a relatively straight pin extending generally longitudinally from the shank portion, whereby said pin may be inserted into the crown portion of the impression to restrain the dowel against movement and to firmly and accurately position the dowel in the impression material.

7. A dental apparatus for use in making a positive replica of a tooth from a negative impression of the tooth formed in impression material, said negative impression material having front and back tooth-defining walls and a crown portion, comprising an elongated metal dowel having an elongated body portion and a shank portion, said body portion having at least one flat surface and being tapered along its longitudinal length to provide a wide end and a narrow end, said shank portion extending longitudinally from the wide end of said body portion, and a relatively straight, elongated metal pin secured to said dowel and extending generally longitudinally from the shank portion, said pin being substantially narrower than the shank portion and of a cross section sized for piercing the impression material in the crown portion thereof so as not to substantially distort the impression material whereby the positive replica will have substantially the same shape as the tooth and whereby said pin may be inserted into the crown portion of the impression to restrain the dowel against movement and to firmly and accurately position the dowel in the impression material.

References Cited

UNITED STATES PATENTS 3,255,992   6/1966   Kersten _____ 249—205
3,277,576   10/1966   Kraft _____ 32—17 XR ROBERT PESHOCK, Primary Examiner U.S. Cl. X.R.

32—40; 249—205